United States Patent
Childers et al.

(10) Patent No.: US 11,037,520 B2
(45) Date of Patent: Jun. 15, 2021

(54) SCREEN CAPTURE PREVENTION

(71) Applicant: INTERNATIONAL BUSINESS MACHINES CORPORATION, Armonk, NY (US)

(72) Inventors: Adam Benjamin Childers, Tucson, AZ (US); Raquel Norel, Bronx, NY (US); Natesan Venkateswaran, Hopewell Junction, NY (US); Carlos Alberto Hoyos, Brooklyn, NY (US); Jayapreetha Natesan, Hopewell Junction, NY (US); Yuk L. Chan, Rochester, NY (US); Susan Shumway, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/676,683

(22) Filed: Nov. 7, 2019

(65) Prior Publication Data
US 2021/0142761 A1 May 13, 2021

(51) Int. Cl.
*G09G 5/36* (2006.01)
*G09G 5/00* (2006.01)
(Continued)

(52) U.S. Cl.
CPC ......... *G09G 5/006* (2013.01); *G06F 3/04886* (2013.01); *G06F 21/6254* (2013.01); *G06F 21/84* (2013.01)

(58) Field of Classification Search
CPC .... G06F 21/10; G06F 21/604; G06F 21/6209; G06F 21/6245; G06F 2221/032; G06F 3/04842; G06F 21/60; G06F 2203/04803; G09G 2340/0435; G09G 2310/04; G09G 2358/00; G09G 3/3618; G09G 5/393; G09G 5/397; H04N 1/00838; H04N 1/00843;
(Continued)

(56) References Cited

U.S. PATENT DOCUMENTS

| 5,426,710 A | 6/1995 | Suzuki et al. |
| 6,614,477 B1 | 9/2003 | Lee et al. |

(Continued)

FOREIGN PATENT DOCUMENTS

EP 3035229 A1 6/2016

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Hau H Nguyen
(74) *Attorney, Agent, or Firm* — Anthony M. Pallone

(57) ABSTRACT

An embodiment of the invention may include a method, computer program product and system for operating an electronic display device. An embodiment may include displaying, using a first refresh rate, first content on a first partition of a display area of the electronic display device. An embodiment may include displaying, using a second refresh rate, second content on a second partition of the display area of the electronic display device. The first refresh rate is different from the second refresh rate.

20 Claims, 7 Drawing Sheets

(51) Int. Cl.
*G06F 21/62* (2013.01)
*G06F 3/0488* (2013.01)
*G06F 21/84* (2013.01)

(58) Field of Classification Search
CPC ..... H04N 1/00883; H04N 2005/91392; H04N 5/913
See application file for complete search history.

(56) References Cited

U.S. PATENT DOCUMENTS

| | | | |
|---|---|---|---|
| 9,076,231 | B1 | 7/2015 | Hill et al. |
| 9,245,500 | B1 | 1/2016 | Zhang |
| 9,336,405 | B2 | 5/2016 | Griffith et al. |
| 9,443,102 | B2 | 9/2016 | Cohen et al. |
| 9,672,373 | B2 | 6/2017 | Griffith et al. |
| 2003/0179412 | A1 | 9/2003 | Matsunoshita |
| 2016/0125785 | A1* | 5/2016 | Wang ............... G09G 5/001 345/582 |
| 2017/0011681 | A1* | 1/2017 | Bathiche ........... G06F 3/04886 |
| 2018/0047342 | A1* | 2/2018 | Wang ............... G09G 3/2044 |

OTHER PUBLICATIONS

Chia et al., "Protecting Against Screenshots: An Image Processing Approach", Jun. 7-12, 2015, 2015 IEEE Conference on Computer Vision and Pattern Recognition (CVPR), pp. 1437-1445.
Tyson, "How LCDs Work", printed Apr. 12, 2019, 26 pages, https://electronics.howstuffworks.com/lcd2.htm.
Disclosed Anonymously, "Automatic Identification of Screen Ruling on Printed Copy", an IP.com Prior Art Database Technical Disclosure, IP.com No. IPCOM000010902D, Publication Date: Jan. 30, 2003, 10 pages.
Disclosed Anonymously, "Method and Apparatus for Identifying and Verifying Graphics Animations Tests", an IP.com Prior Art Database Technical Disclosure, IP.com No. IPCOM000214692D, Publication Date: Feb. 3, 2012, 7 pages.
Disclosed Anonymously, "Mobile Scan to Copy with Scaling", an IP.com Prior Art Database Technical Disclosure, IP.com No. IPCOM000252161D, Publication Date: Dec. 19, 2017, 2 pages.
Morrill, "Frame Rate Vs. Shutter Speed—Setting The Record Straight", The Vimeo Blog, Feb. 24, 2011, 15 pages.
Wikipedia, "Pixel", printed Apr. 12, 2019, 8 pages, https://en.wikipedia.org/wiki/Pixel.
Pueo, "High speed cameras for motion analysis in sports science", Journal of Human Sport & Exercise, vol. 11, Issue 1, Jan. 2016, pp. 53-73.

* cited by examiner

SCREEN CAPTURE PREVENTION

BACKGROUND

Embodiments of the present invention relate generally to the fields of computing input/output (I/O) and display software/hardware, and more specifically, to preventing the capture of content displayed via a monitor.

In computing, input/output or I/O is the communication between an information processing system, such as a computer, and the outside world (e.g., a user of the computer). Usually, an electronic display device (e.g., a computer monitor) is used as an I/O output device to display content in pictorial form to a user. A computer monitor usually comprises the display device, circuitry, casing, and power supply. The display device in modern monitors is typically a thin film transistor liquid crystal display (TFT-LCD) with LED backlighting. Monitors are connected to the computer via VGA, Digital Visual Interface (DVI), HDMI, DisplayPort, Thunderbolt, low-voltage differential signaling (LVDS), or other proprietary connectors and signals.

BRIEF SUMMARY

An embodiment of the invention may include a method, computer program product and system for operating an electronic display device. An embodiment may include displaying, using a first refresh rate, first content on a first partition of a display area of the electronic display device. An embodiment may include displaying, using a second refresh rate, second content on a second partition of the display area of the electronic display device. The first refresh rate is different from the second refresh rate.

DETAILED DESCRIPTION

Figure 1:
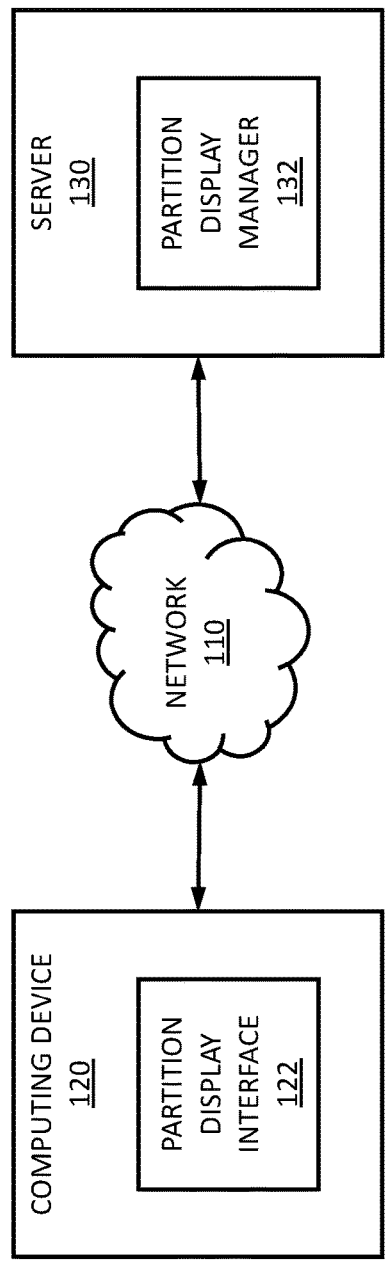
FIG. 1 is a block diagram illustrating a partition display system, in accordance with an embodiment of the present invention.

As mentioned above, I/O devices may include pieces of hardware used by a user of a computer, or other system, to communicate with the computer, and an electronic display device is typically used as an output device to facilitate that communication by displaying information processed by the computer. Multiple technologies have been used for electronic display devices, however, cathode ray tubes (CRT) and liquid crystal displays (LCD) are the predominantly used technologies, with the former having largely been superseded by the latter. To the extent that common aspects regarding the operation and functionality of CRT and LCD technology (e.g., refresh rate, frame rate, display resolution, response time, aspect ratio, pixel size, viewable image size, etc. . . . ) are mentioned below, such common aspects are well known in the art and the details of their implementation are omitted for the sake of brevity.

In addition to facilitating communication between the computer and a corresponding user, computer monitors also allow for the sharing of information between users of the computer. Very often, information/content displayed on a monitor is desirable to share with one or more other users who may also be viewing the monitor. However, while it often may be desirable to share the displayed content, it may be just as undesirable for the one or more other users to store the displayed content through mechanisms such as taking a screen capture or taking a photographic image of the displayed content. For instance, the displayed content may include sensitive or restricted information (e.g., medical information, human resources information, sensitive business information, financial information, personal information, information governed by the General Data Protection Regulation) and while it may be beneficial or necessary to share such information with another user, it may be disadvantageous for another user to store such information in a screen capture or photographic image taken with an external device (e.g., a camera, a smartphone).

In an effort to prevent the storing of content displayed via an electronic display device (e.g., a computer monitor), embodiments of the present invention include a Partition Display System (PDS) 100, described below, which presents a method for partitioning the display area of an electronic display device and applying a visual effect (e.g., a visual distortion) to one or more display area partitions in combination with a dynamically applied refresh rate which differs from the refresh rate of one or more other display area partitions without an applied visual effect. In embodiments of the present invention, Partition Display System 100 may allow for only a subset of the display area partitions to be displayed via the electronic display device at the same time. Consequently, storing, via a screen capture or photographic image, of the content displayed by the electronic display device would be incomplete as the entirety of the display area partitions would not be displayed at the same time. In embodiments of the present invention, partition boundaries of the display area of the electronic display device may be determined based on the content displayed in the display area or based on user selections of one or more partitions of the display area of the electronic display device. Furthermore, in embodiments of the invention, PDS 100 may be implemented as a standalone software application, as a cloud service, or via display hardware (e.g., a video graphics card).

In embodiments of the invention, the applied visual effect provided by PDS 100 may be implemented through an adjustment of values for one or more settings which pertain to the display, via the electronic display device, of content within a partition of the display area. The one or more display settings may include, for example, refresh rate, frame rate, display resolution, response time, aspect ratio, pixel size, and viewable image size. For instance, in the case of an LCD electronic display device, refresh rate is the number of times per second in which the display draws the data it is being given; setting a high refresh rate for one or more partitions may result in visual artifacts that distort the content displayed within those partitions. As another example, values affecting settings which control frame rate and/or pixel size within one or more partitions of the display area may be adjusted to produce a desired visual distortion. It is to be noted that the afore mentioned display settings are recited for illustrative purposes and are not meant to recite an exhaustive list of display settings which may be adjusted to produce a desired visual effect. In embodiments of the invention, PDS 100 may allow a user to implement varying levels/intensities of the applied visual effect to one or more partitions of the display area of the electronic display device.

In an alternate embodiment of the invention, the partitioning of the display area of the electronic display device and the dynamic application of a refresh rate for one or more partitions of the display area may be implemented via display hardware (e.g., a video graphics card of a computing device) or display driver software. Such an embodiment may be referred to as a video card/driver implementation of PDS 100.

Embodiments of the present invention will now be described in detail with reference to the accompanying Figures.

FIG. 1 is a functional block diagram illustrating Partition Display System 100, in accordance with an embodiment of the present invention. In an example embodiment, PDS 100 may include computing device 120 and server 130, interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between computing device 120 and server 130.

In an example embodiment, computing device 120 may include partition display interface 122. Computing device 120 may be a laptop computer, a notebook, a tablet computer, a netbook computer, a personal computer (PC), a desktop computer, a personal digital assistant (PDA), a smartphone, or any other electronic device or computing system capable of producing content in pictorial form for display to a user via a connected electronic display device. Computing device 120 may also be capable of sending and receiving data to and from other computing devices such as server 130, via network 110, and capable of supporting the functionality required of embodiments of the invention. For example, computing device 120 may support a communication link (e.g., wired, wireless, direct, via a LAN, via the network 110, etc.) between computing device 120 and server 130. Data sent from computing device 120 may include data from partition display interface 122. Data received by computing device 120 may include data/instructions sent, via server 130 and network 110, from partition display manager 132, described below. Computing device 120 may be described, generally, with respect to FIG. 5 below. In an example embodiment, computing device 120 (e.g., the user's laptop) may send data captured by partition display interface 122 to server 130, via network 110.

In an example embodiment, partition display interface (PDI) 122 may be a program, or subroutine contained in a program, that may allow a user of computing device 120 to interact with partition display manager 132 hosted on server 130, via network 110. In embodiments of the invention, partition display interface 122 may capture input from a user of computing device 120 concerning the partitioning of the display area of an electronic display device connected to computing device 120. For example, the user may select, via PDI 122, one or more areas of the display area for partitioning by partition display manager 132. In embodiments of the invention, partition display interface 122 may also capture input from the user concerning the visual effect to be applied to the one or more areas selected for partitioning. For example, the user may select, via PDI 122, the type of effect/distortion (e.g., refresh rate, frame rate, display resolution, response time, aspect ratio, pixel size, viewable image size, etc. . . . ) and intensity level to be applied to the selected areas for partitioning. In an example embodiment, partition display interface 122 may actively monitor the display area of a connected electronic display device to dynamically identify screen areas for protection through potential partition and application of a visual effect based on parameters for pre-defined types of content that are commonly considered to be sensitive information, personally identifying information, or restricted information (e.g., numbers, capitalization, names) and therefore would benefit from protection against external storage. In an example embodiment, PDI 122 may transmit any received user inputs/selections and any dynamically identified information (e.g., screen areas for potential partition and application of a visual effect and/or content which matches one or more the pre-defined types above) to partition display manager 132, via network 110. In an example embodiment, PDI 122 may also receive, via network 110, commands/instructions from partition display manager 132 which specify details of the partitions, and the corresponding visual effect, to be implemented in the display area of the electronic display device connected to computing device 120.

Figure 5:
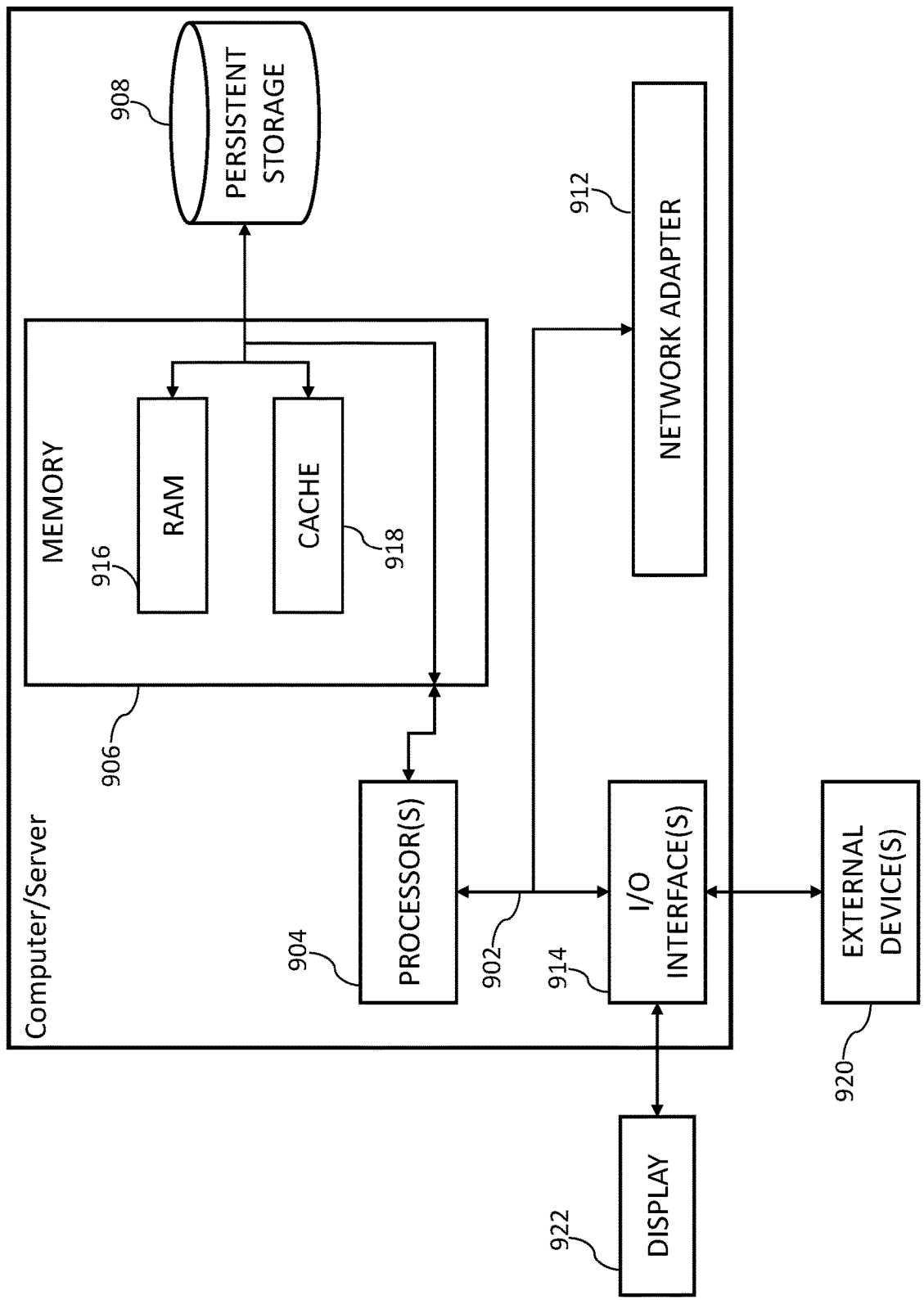
FIG. 5 is a block diagram depicting the hardware components of the partition display system of FIG. 1, in accordance with an embodiment of the invention.

In addition, partition display interface 122 may be connectively coupled to hardware components, such as those depicted by FIG. 5, for receiving user input, including mice, keyboards, touchscreens, and the like. For example, partition display interface 122 may receive digital information from a keyboard or touchscreen connected to computing device 120 for transmission to partition display manager 132 on server 130. In an example embodiment, partition display interface 122 is implemented via a web browsing application containing a graphical user interface (GUI) and display that is capable of transferring received and identified data. In other embodiments, partition display interface 122 may be implemented via other integrated or standalone software applications and hardware capable of receiving user interaction and communicating with other electronic devices. In yet other embodiments, the operation and functionality of partition display interface 122 may be performed by partition display manager 132.

In an example embodiment, server 130 may include partition display manager 132. Server 130 may be a desktop computer, a notebook, a laptop computer, a blade server, a networked computer appliance, a virtual device, or any other networked electronic device or computing system capable of receiving and sending data from and to other computing devices such as computing device 120, via network 110, and capable of supporting the functionality required of embodiments of the invention. In an example embodiment, server 130 may function to process data received from computing device 120. While server 130 is shown as a single device, in other embodiments, server 130 may be comprised of a cluster or plurality of computing devices, working together or working separately. Server 130 may be described generally with respect to FIG. 5 below.

In an example embodiment, partition display manager (PDM) 132 may be a program, or subroutine contained in a program, that may operate to dynamically partition the display area of an electronic display device into one or more areas for protection based on the type of content displayed within the one or more areas. For example, PDM 132 may partition, or cause to be partitioned, a section of the display area of an electronic display device in response to identifying sensitive or restricted information being displayed within that section. Furthermore, in an example embodiment, PDM 132 may also operate to generate and apply, or cause to be generated and applied, a random refresh rate to the one or more partitioned areas in combination with a visual effect. The random refresh rate and visual effect implemented by, or directed by, PDM 132 may visually distort the one or more partitioned areas sufficiently enough to prevent storage of the displayed content via a screen capture or photographic image taken with an external device (e.g., a camera, a smartphone). As part of its operation, partition display manager 132 may, in an example embodiment, receive and transmit data from and to PDI 122 located on computing device 120, via server 130 and network 110. For example, partition display manager 132 may receive, via network 110, data from PDI 122 which contains information concerning the display area (e.g., refresh rate, frame rate, display resolution, response time, aspect ratio, pixel size, viewable image size, etc. . . . ) of an electronic display device connected to computing device 120 and information concerning the content displayed within the display area of the electronic display device. As another example, partition display manager 132 may transmit, via network 110, instructions to PDI 122 which control/direct aspects (e.g., refresh rate, visual effect) of the display of content by the electronic display device connected to computing device 120. The operations and functions of partition display manager 132 are described in further detail below with regard to FIG. 2.

Figure 2:
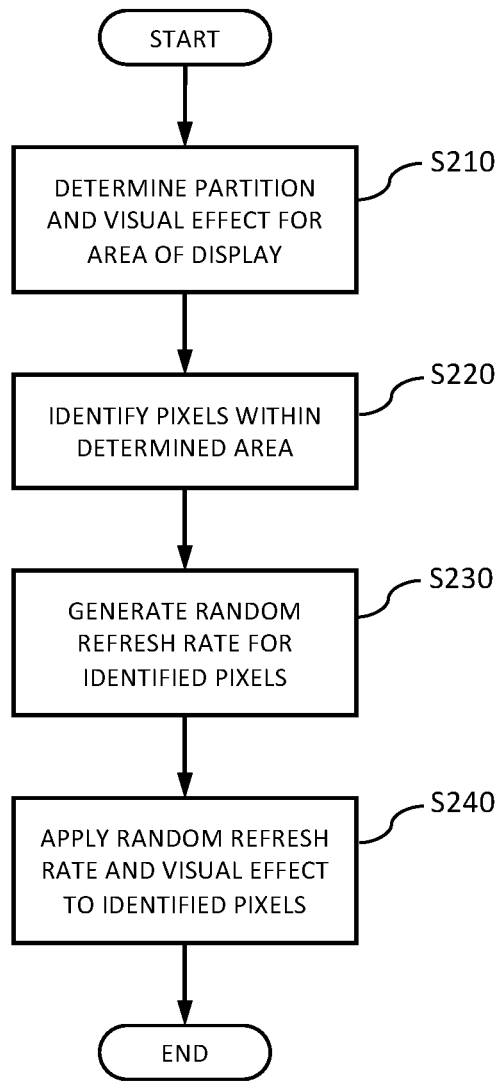
FIG. 2 is a flowchart illustrating the operations of the partition display manager of FIG. 1, in accordance with an embodiment of the invention.

FIG. 2 shows a flowchart illustrating the operations of partition display manager 132 in accordance with an example embodiment of the invention. Referring to step S210, partition display manager 132 may determine one or more areas of a display area, of an electronic display device connected to computing device 120, for protection via partition and application of a visual effect (i.e., a visual distortion). In an example embodiment, partition display manager 132 dynamically determines one or more partition boundaries of the display area based on content displayed within the display area. Furthermore, in an example embodiment, partition display manager 132 determines and/or suggests a visual distortion for the determined partitions based on pre-defined inputs that are commonly sensitive (e.g., numbers, capitalization, names, etc.) and require protection. Such pre-defined inputs may be established by a user of PDS 100 or may be part of a default list managed by PDM 132. Partition display manager 132 may actively monitor, via PDI 122, displayed content for parameters which match the pre-defined inputs. For example, a user of computing device 120 may enter a 9-digit social security number, data concerning this input may be captured by PDI 122 and transmitted to PDM 132, via network 110. PDM 132 may then determine a partition for the screen area displaying the social security number and determine a visual distortion to be applied within the boundaries of the partition.

In another embodiment, the user may select, via PDI 122, one or more areas of the display area of the electronic display device connected to computing device 120 for protection via partition and application of a visual effect (i.e., a visual distortion). Selections of the user may be transmitted, via network 110, by PDI 122 for implementation by PDM 132. In yet another embodiment, partition display manager 132 may randomly partition the display area of the electronic display device connected to computing device 120. For example, in a situation where the user does not provide selections of one or more areas of the display area for protection, PDM 132 may determine to partition the display area of the electronic display device connected to computing device 120 in random size vertical strips.

Referring to steps S220 and S230, in an example embodiment, partition display manager 132 may identify the pixels within the one or more partitions determined in step S210 and generate a random refresh rate for the pixels identified in step S220, respectively. It is important to note that the random refresh rate determined in step S230 is solely for the pixels identified within the one or more partitions determined in step S210, and not for the pixels comprising the display area outside of the one or more determined partitions (i.e., unidentified pixels). The pixels comprising the display area outside of the one or more determined partitions will continue to be displayed according to a default or constant refresh rate.

In another embodiment where more than one partition is determined in step S210, PDM 132 may, in step S230, generate a different random or variable refresh rate for different partitions of the one or more determined partitions. In an embodiment where PDM 132 determines to partition the display area of the electronic display device connected to computing device 120 in random size vertical strips, PDM 132 may also determine a different random refresh rate for each determined vertical strip partition of the display area.

Referring to step S240, in an example embodiment, partition display manager 132 applies, or causes to be applied via PDI 122, the random refresh rate generated in step S230 to the pixels identified in step S220. Furthermore, in step S240, partition display manager 132 also applies, or causes to be applied via PDI 122, the visual effect (i.e. visual distortion), determined in step S210, to the pixels identified in step S220. In an example embodiment, the determined visual distortion may be implemented through an adjustment of values for one or more settings which pertain to the display, via the electronic display device, of the pixels within a determined partition of the display area. The one or more display settings may include, for example, refresh rate, frame rate, display resolution, response time, aspect ratio, pixel size, and viewable image size.

In an embodiment, PDM 132 may determine a level/intensity of visual distortion to be applied based on a security attribute or sensitivity attribute of the application in which PDS 100 is being implemented. For example, in a lightly secured application or a mildly sensitive application, PDM 132 may determine that a low-level or low-intensity visual distortion be applied. Such a low-level or low-intensity visual distortion may be accomplished through adjustment of a single display setting (e.g., deploying a different pixel size for identified pixels). As another example, in a highly secured or highly sensitive application, PDM 132 may determine that a high-level or high-intensity visual distortion be applied. Such a high-level or high-intensity visual distortion may be accomplished through concurrent adjustment of values for multiple display settings (e.g., deploying both a variable pixel size and a variable frame rate for identified pixels). Furthermore, in an embodiment, PDM 132 may determine a different level of visual distortion to be applied to different partitions of the one or more partitions determined in step S210. In another embodiment, PDM 132 may determine the level of visual distortion to be applied based on parameters which match pre-defined inputs that are commonly sensitive (e.g., numbers, capitalization, names, etc.) and require protection. In yet another embodiment, one or more levels of visual distortion to be implemented by PDM 132 may be based on user selection. For example, the user may select different areas (e.g., partitions) of the display area for implementation of different levels/intensities of visual distortion by PDM 132. Moreover, in such an embodiment, the user may specify a degree of adjustment of one or more display settings.

In an alternate embodiment of the invention, referred to earlier as the video card/driver implementation of PDS 100, the partitioning of the display area of the electronic display device and the dynamic update/application of the refresh rate of one or more of the partitions may be implemented in the display hardware or display driver executed by a video card's graphics processing unit (GPU). Many modern video cards/drivers support multiple buffers, for example, dual frame buffers. A feature of dual frame buffers may be that while a buffer A is being rendered, a buffer B is being filled with data for the next frame. Moreover, after buffer A is completely rendered, buffer B will be rendered, and buffer A will be used to store data for the upcoming frame. The following table illustrates an example of two buffers which may implemented in the alternate embodiment:

| Buffer A | Buffer B |
| --- | --- |
| Partition (1, A) | Partition (1, B) |
| Partition (2, A) | Partition (2, B) |
| Partition (3, A) | Partition (3, B) |
| Partition (4, A) | Partition (4, B) |

In this example there are two frame buffers: Buffer A is the current buffer; Buffer B is the next buffer. Each frame buffer is divided into four partitions: Partition(1,A); Partition(2,A); Partition(3,A); Partition(4,A); Partition(1,B); Partition(2,B); Partition(3,B); and Partition(4,B). In furtherance of this example, checksum(x) refers to the checksum for buffer x and provides a mechanism to determine if the data/content of one buffer equals the data/content of another buffer. For instance, if checksum(A)=checksum(B), then Buffer A and Buffer B contain the same data/content. Additionally, partition(n.x) refers to partition n for buffer x. In the alternate embodiment, the video driver may keep a partition status table which lists partition number, the most recent checksum, and the last time the partition was displayed (LTPD). The LTPD may be used to determine whether the partition is secured to display via the electronic display device. The following table illustrates an example of a partition status table which may implemented in the alternate embodiment:

| Partition = 1 | Checksum = 10 | Displayed = 1 |
| --- | --- | --- |
| Partition = 2 | Checksum = 10 | Displayed = 2 |
| Partition = 3 | Checksum = 10 | Displayed = 1 |
| Partition = 4 | Checksum = 10 | Displayed = 2 |

Figure 3:
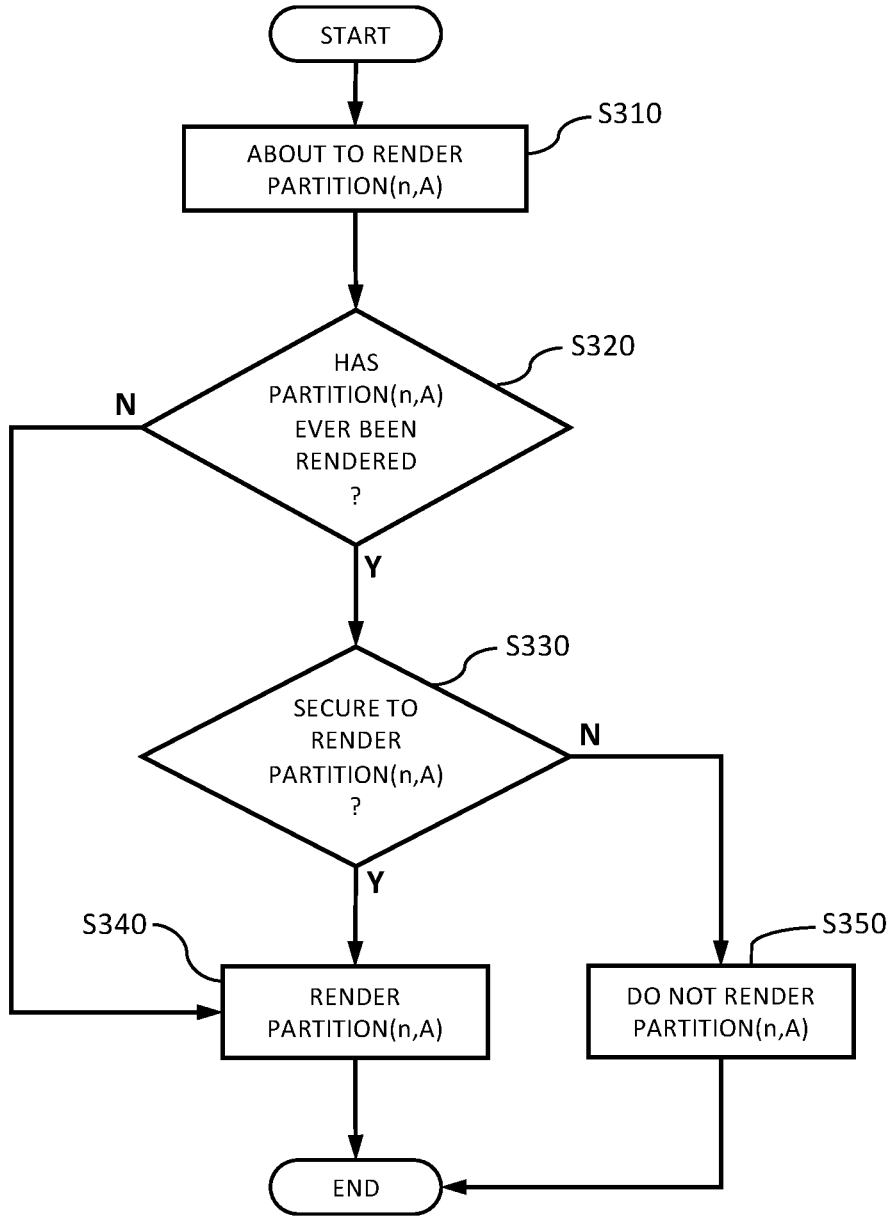
FIG. 3 is a flowchart illustrating the operations of the partition display manager of FIG. 1, in accordance with an alternate embodiment of the invention.
Figure 4:
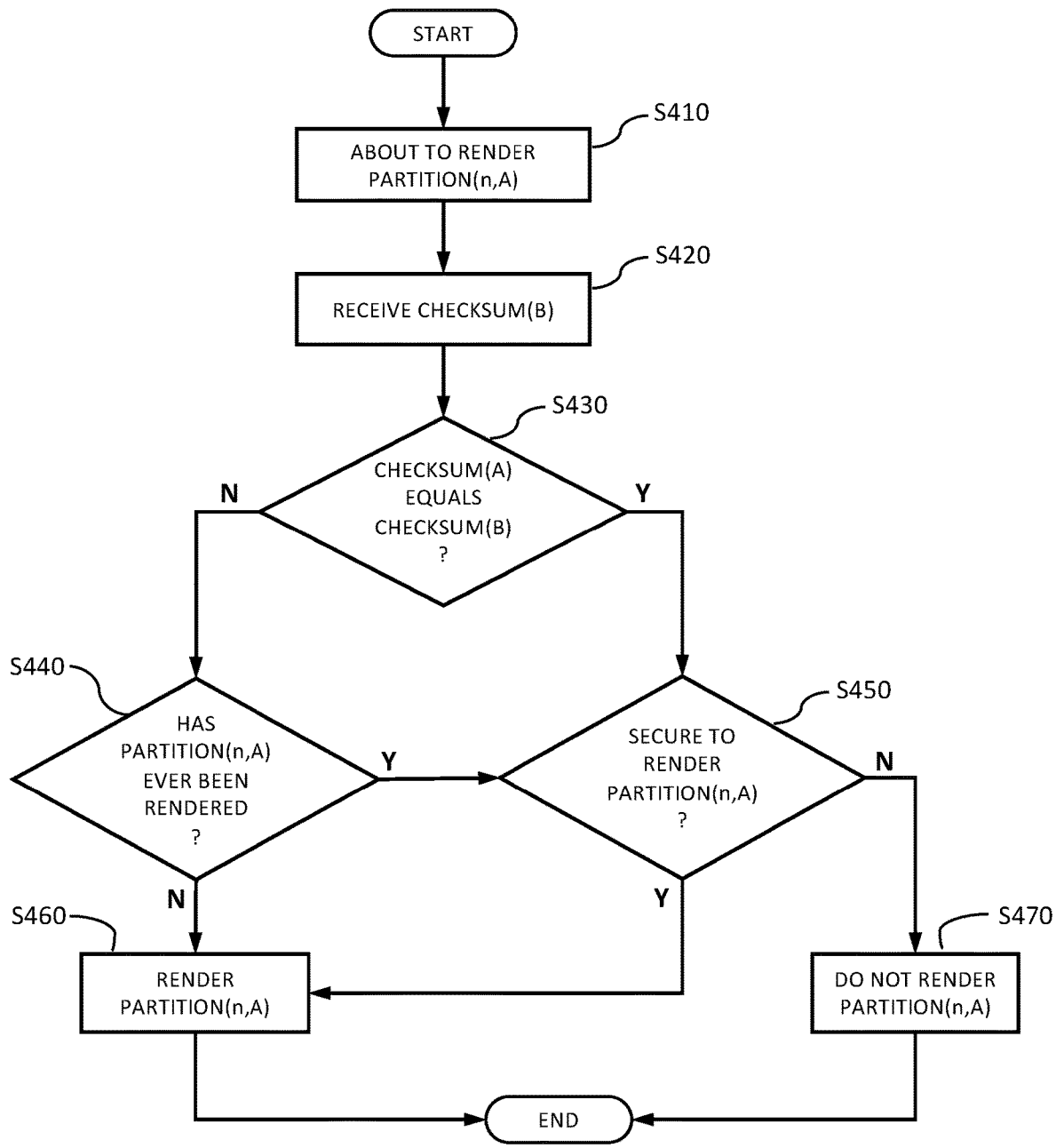
FIG. 4 is a flowchart illustrating further operations of the partition display manager of FIG. 1, in accordance with an alternate embodiment of the invention.

In this example "Displayed=1" means that data/content was displayed in the last refresh of the display area and "Displayed=2" means that data/content was displayed two refreshes ago. In the alternate embodiment, if a partition was displayed in the last refresh of the display area, the video card/driver implementation of PDS 100 may consider it un-secure to display a partition with the same checksum (i.e., same data/content) in the current display refresh. Steps S310 through S350 of FIG. 3 illustrate a flow chart in which the video card/driver implementation of PDS 100 renders Buffer A without comparison to the checksum of Buffer B. In step S310, the video card/driver implementation of PDS 100 is about to display partition(n,A) in a current refresh. However before doing so, it is determined in step S320 if partition(n,A) has ever been rendered previously. Note that if it is determined in step S320 that a partition was never rendered previously, that partition will always be rendered (step S340) in the current refresh of the display area. Consequently, the entire frame buffer will always display for the first time and only the future refreshes of the display area will be secured. If it has been determined that partition(n,A) has been previously rendered, in step S350 it is determined if it is secure to render partition(n,A) in the current refresh. If yes, the flow proceeds to step S340. If it is not secure to render partition(n,A), the flow proceeds to step S350. Steps S410 through S470 of FIG. 4 illustrate a flow chart for an improved solution in which the video card/driver implementation of PDS 100 renders Buffer A with the benefit of comparison to the checksum of Buffer B. In step S410, the video card/driver implementation of PDS 100 is about to display partition(n,A) in a current refresh. However before doing so, the checksum for Buffer B is received in step S420 and a determination is made is step S430 on whether the checksum for Buffer A is equal to the received checksum for Buffer B. If it is determined that the checksum values are equal, the flow proceeds to step S450 where it is determined if it is secure to render partition(n,A) in the current refresh. However, if it is determined that the checksum values are not equal, the flow proceeds to step S440 where it is determined if partition(n,A) has ever been rendered in a previous refresh. Note that the benefit of looking ahead into Buffer B, at steps S420 and S430, is that the video card/driver implementation of PDS 100 may not render the remaining content of Buffer A in the current refresh of the display area (step S470).

Depending on the security algorithm implemented, the partition status table may be used to track partitions from more than two refreshes of the display area (e.g., the last 6 refreshes). An example security algorithm could choose to display a partition two times every three refreshes, where at most 75% of a partition can be displayed in one refresh of the display area. Additionally, the video card/driver implementation of PDS 100 may generate a checksum for each partition(n.x) of dynamic display content such as video. Furthermore, a sophisticated video card, of the video card/driver implementation of PDS 100, may implement object recognition (e.g., pictures vs text, the pixel boundary of paragraphs) and the buffer partitioning algorithm may be based on content.

FIG. 5 depicts a block diagram of components of computing device 120 and server 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 120 and server 130 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs partition display interface 122 in computing device 120; and partition display manager 132 in server 130 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs partition display interface 122 in computing device 120; and partition display manager 132 in server 130 may be downloaded to persistent storage 908 through network adapter 912.

I/O interface(s) 914 allows for input and output of data with other devices that may be connected to computing device 120 and server 130. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs partition display interface 122 in computing device 120; and partition display manager 132 in server 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
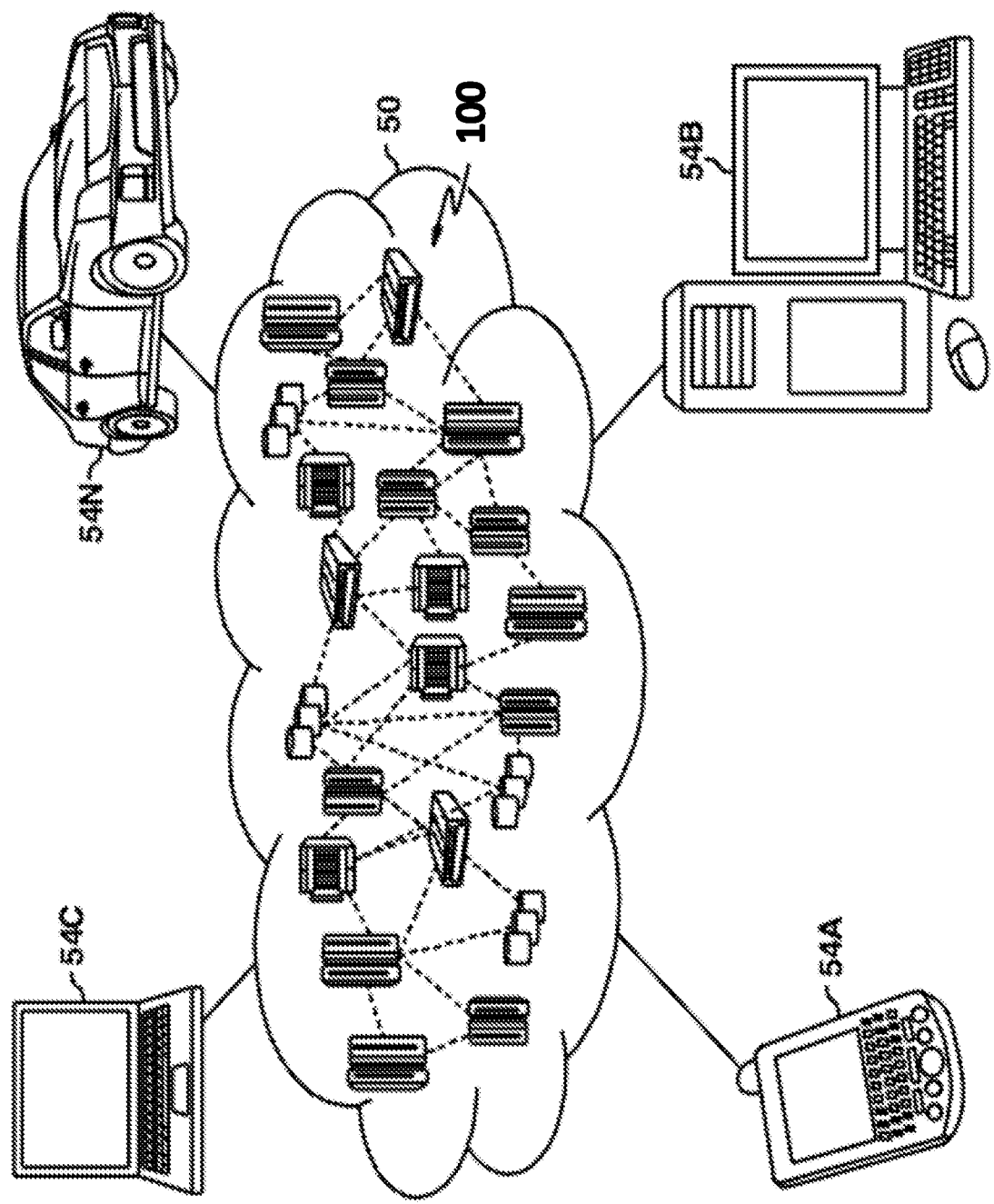
FIG. 6 depicts a cloud computing environment in accordance with an embodiment of the present invention.

Referring now to FIG. 6, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
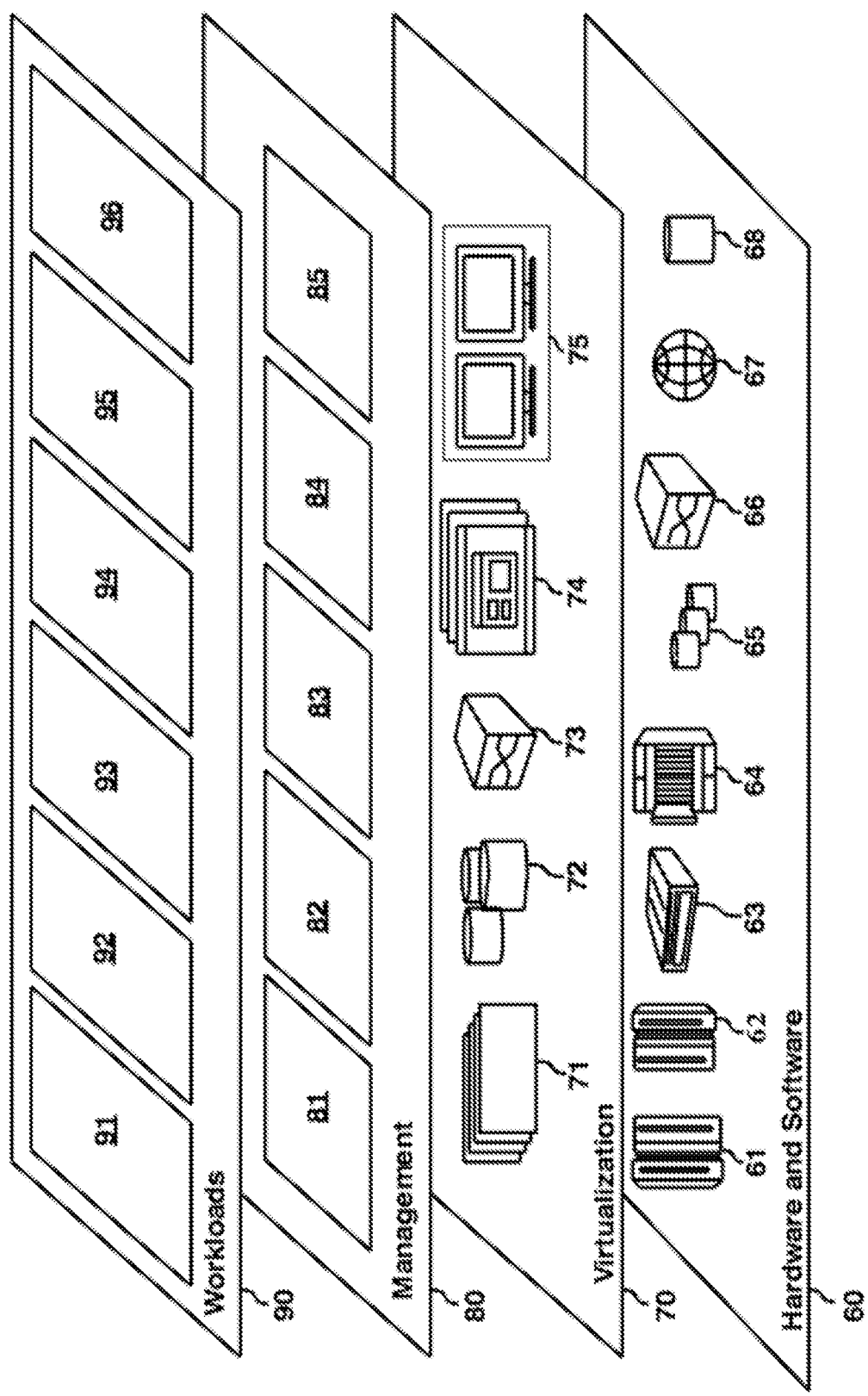
FIG. 7 depicts abstraction model layers in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and partition display system 96. Partition display system 96 may relate to partitioning the display area of an electronic display device and applying a visual effect (e.g., a visual distortion) to one or more display area partitions in combination with a dynamically applied refresh rate which differs from the refresh rate of one or more other display area partitions without an applied visual effect.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for operating an electronic display device, the method comprising:
   partitioning a display area of the electronic display device into one or more areas for protection against external storage, wherein the partitioning is based on a type of content displayed within the one or more areas, and wherein the type of content displayed comprises sensitive information;
   displaying within the one or more areas the type of content using a first refresh rate in combination with an applied visual effect, wherein the combination of the first refresh rate and the applied visual effect visually distorts the type of content displayed within the one or more areas so as to prevent storage, via a screen capture or photographic image taken with an external device, of the type of content displayed within the one or more areas; and displaying, using a second refresh rate, second content displayed within one or more other display area partitions of the electronic display device, wherein the first refresh rate is different from the second refresh rate.

2. The computer-implemented method of claim 1, further comprising:

identifying one or more partition boundaries of the display area of the electronic display device based on content displayed in the display area;

defining a first partition and a second partition of the display area of the electronic display device, based on the identified partition boundaries; and applying a visual effect to at least one of the first partition and the second partition of the display area of the electronic display device.

3. The computer-implemented method of claim 1, further comprising:

receiving, from a user, a selection of one or more partitions of the display area of the electronic display device; and defining a first partition and a second partition of the display area of the electronic display device, based on the selection.

4. The computer-implemented method of claim 1, further comprising:

setting values for the first refresh rate and for the second refresh rate.

5. The computer-implemented method of claim 4, wherein setting values for the first refresh rate and for the second refresh rate comprises:

assigning a random refresh rate to each of the first refresh rate and the second refresh rate.

6. The computer-implemented method of claim 4, wherein setting values for the first refresh rate and for the second refresh rate comprises:

assigning a user defined refresh rate to at least one of the first refresh rate and the second refresh rate.

7. The computer-implemented method of claim 1, wherein displaying comprises:

activating one or more pixels of the electronic display device at least twice within a time interval.

8. The computer-implemented method of claim 1, wherein the first refresh rate is constant and the second refresh rate is dynamic.

9. The computer-implemented method of claim 8, wherein the second refresh rate is determined via a hardware component of the electronic display device.

10. The computer-implemented method of claim 8, wherein the second refresh rate is determined via a display driver operatively connected to the electronic display device.

11. A computer program product for operating an electronic display device, the computer program product comprising:

one or more non-transitory computer-readable storage devices and program instructions stored on at least one of the one or more non-transitory computer-readable storage devices, wherein the program instructions are executable by a computer, the program instructions comprising:

program instructions to partition a display area of the electronic display device into one or more areas for protection against external storage, wherein the partitioning is based on a type of content displayed within the one or more areas, and wherein the type of content displayed comprises sensitive information;

program instructions to display within the one or more areas the type of content using a first refresh rate in combination with an applied visual effect, wherein the combination of the first refresh rate and the applied visual effect visually distorts the type of content displayed within the one or more areas so as to prevent storage, via a screen capture or photographic image taken with an external device, of the type of content displayed within the one or more areas; and program instructions to display, using a second refresh rate, second content displayed within one or more other display area partitions of the electronic display device, wherein the first refresh rate is different from the second refresh rate.

12. The computer program product of claim 11, further comprising:

program instructions to identify one or more partition boundaries of the display area of the electronic display device based on content displayed in the display area;

program instructions to define a first partition and a second partition of the display area of the electronic display device, based on the identified partition boundaries; and program instructions to apply a visual effect to at least one of the first partition and the second partition of the display area of the electronic display device.

13. The computer program product of claim 11, further comprising:

program instructions to receive, from a user, a selection of one or more partitions of the display area of the electronic display device; and program instructions to define a first partition and a second partition of the display area of the electronic display device, based on the selection.

14. The computer program product of claim 11, further comprising:

program instructions to set values for the first refresh rate and for the second refresh rate.

15. The computer program product of claim 14, wherein setting values for the first refresh rate and for the second refresh rate comprises:

program instructions to assign a random refresh rate to each of the first refresh rate and the second refresh rate.

16. The computer program product of claim 11, wherein the first refresh rate is constant and the second refresh rate is dynamic.

17. A computer system for operating an electronic display device, the computer system comprising:

one or more processors, one or more computer-readable memories, one or more non-transitory computer-readable storage devices, and program instructions stored on at least one of the one or more non-transitory computer-readable storage devices for execution by at least one of the one or more processors via at least one of the one or more memories, the program instructions comprising:

program instructions to partition a display area of the electronic display device into one or more areas for protection against external storage, wherein the partitioning is based on a type of content displayed within the one or more areas, and wherein the type of content displayed comprises sensitive information;

program instructions to display within the one or more areas the type of content using a first refresh rate in combination with an applied visual effect, wherein the combination of the first refresh rate and the applied visual effect visually distorts the type of content displayed within the one or more areas so as to prevent storage, via a screen capture or photographic image taken with an external device, of the type of content displayed within the one or more areas; and program instructions to display, using a second refresh rate, second content displayed within one or more other display area partitions of the electronic display device, wherein the first refresh rate is different from the second refresh rate.

18. The computer system of claim 17, further comprising:

program instructions to identify one or more partition boundaries of the display area of the electronic display device based on content displayed in the display area;

program instructions to define a first partition and a second partition of the display area of the electronic display device, based on the identified partition boundaries; and program instructions to apply a visual effect to at least one of the first partition and the second partition of the display area of the electronic display device.

19. The computer system of claim 17, further comprising:

program instructions to receive, from a user, a selection of one or more partitions of the display area of the electronic display device; and program instructions to define a first partition and a second partition of the display area of the electronic display device, based on the selection.

20. The computer system of claim 17, wherein the first refresh rate is constant and the second refresh rate is dynamic.

* * * * *